United States Patent
Nakamura et al.

(10) Patent No.: US 8,203,326 B2
(45) Date of Patent: Jun. 19, 2012

(54) POSITION SENSOR

(75) Inventors: Takehide Nakamura, Handa (JP); Tomoaki Inoue, Nagoya (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 422 days.

(21) Appl. No.: 12/459,000

(22) Filed: Jul. 29, 2009

(65) Prior Publication Data
US 2010/0066347 A1 Mar. 18, 2010

(30) Foreign Application Priority Data
Sep. 16, 2008 (JP) .................................. 2008-236355

(51) Int. Cl.
*G01R 19/00* (2006.01)
(52) U.S. Cl. ................................ 324/76.11; 324/207.11
(58) Field of Classification Search ............... 324/76.11, 324/207.11, 207.25
See application file for complete search history.

(56) References Cited

U.S. PATENT DOCUMENTS
2,572,332 A * 10/1951 Goodwin et al. ............... 33/311
2009/0224751 A1* 9/2009 Budde et al. ............. 324/207.17

FOREIGN PATENT DOCUMENTS
| JP | A-10-111145 | 4/1998 |
| JP | B1-3047231 | 3/2000 |
| JP | A-2007-57316 | 3/2007 |
| JP | A-2008-89409 | 4/2008 |

* cited by examiner

*Primary Examiner* — Vincent Q Nguyen
(74) *Attorney, Agent, or Firm* — Oliff & Berridge, PLC

(57) ABSTRACT

A resolver includes an excitation coil for receiving an excitation signal formed by amplitude modulation of a high-frequency signal and a detection coil for outputting a detection signal. The resolver is arranged to detect a change in position of a rotor provided with the excitation coil or the detection coil based on the detection signal varying with the change in position of the rotor. The high-frequency signal is a digitized signal generated from a reference clock.

5 Claims, 6 Drawing Sheets

POSITION SENSOR

CROSS-REFERENCE TO RELATED APPLICATIONS

This application is based upon and claims the benefit of priority from the prior Japanese Patent Application No. 2008-236355 filed on Sep. 16, 2008, the entire contents of which are incorporated herein by reference.

TECHNICAL FIELD

The present invention relates to a position sensor including an excitation coil for receiving an excitation signal formed by amplitude modulation of a high-frequency wave, a detection coil for outputting a detection signal, the position sensor being adapted to detect a change in position of a moving object provided with the excitation coil or the detection coil, based on the detection signal varying with the change in position of the moving object.

BACKGROUND ART

Heretofore, a high-power brushless motor has been employed in a hybrid electric vehicle or an electric vehicle. To control the brushless motor in the hybrid electric vehicle, it is necessary to accurately detect the rotational position of an output shaft of a motor. This is because the rotational position (a rotation angle) of a rotor has to be detected in order to control switching of energization to each coil. In vehicles, particularly, cogging is apt to deteriorate driveability and hence there is a demand for reducing such cogging. For this end, accurate switching of energization is requested.

For detecting the position of a motor shaft of a vehicle, a resolver is used because of good high heat resistance, noise resistance, vibration resistance, high humidity resistance, etc. The resolver is incorporated in the motor and directly attached to the rotor shaft.

For instance, a resolver of Patent Literature 1 is arranged to amplitude modulate a high-frequency wave with a sine wave and a cosine wave and then input the amplitude-modulated high-frequency wave as an excitation signal to an excitation coil. This can provide an effect of reducing the number of turns of each excitation coil. Herein, the sine wave, the cosine wave, and the high-frequency wave are analog waves.

Furthermore, Patent Literatures 2 to 4 disclose that an output signal detected and output by a detection coil is converted to digital.

CITATION LIST

Patent Literature

Patent Literature 1: Japanese patent No. 3047231
Patent Literature 2: JP 10(1998)-111145 A
Patent Literature 3: JP 2007-57316 A
Patent Literature 4: JP 2008-89409 A

SUMMARY OF INVENTION

Technical Problem

However, the conventional resolvers have the following disadvantages. Specifically, in general, a sine wave which is an analog wave is branched and phase-shifted in a CR circuit to generate a cosine wave. If an external temperature changes, therefore, a phase shift error of the cosine wave occurs with respect to the sine wave due to temperature characteristics of the circuit. Such an error caused in the cosine wave would lead to an erroneous result of positional detection of the moving object.

The present invention has been made to solve the above problems and has a purpose to provide a position sensor which generates less detection errors even when temperature changes occur.

Solution to Problem

To achieve the above purpose, there is a provided a position sensor comprising: an excitation coil for receiving an excitation signal formed by amplitude modulation of a high-frequency signal; and a detection coil for outputting a detection signal, one of the excitation coil and the detection coil being to be provided in a moving object, and the position sensor being arranged to detect a change in position of the moving body based on a detection signal varying with the change in position of the moving body, wherein the excitation signal is a digitized signal produced based on a reference clock.

Advantageous Effects of Invention

The operations and effects of the position sensor having the above configurations are explained below.

The position sensor of the present invention comprises: an excitation coil for receiving an excitation signal formed by amplitude modulation of a high-frequency signal; and a detection coil for outputting a detection signal, one of the excitation coil and the detection coil being to be provided in a moving object, and the position sensor being arranged to detect a change in position of the moving body based on a detection signal varying with the change in position of the moving body. The excitation signal is a digitized signal generated based on the reference clock. No CR circuit for analogy is therefore used for phase shift. Thus, a phase shift (displacement) error is not caused by temperature variation. Specifically, a sine wave and a cosine wave shifted or displaced by accurate 90° from each other are produced by use of the reference clock, thereby reducing the phase shift error.

The open timing of the gate for passing the detection signal is delayed by a time corresponding to rising of the detection signal to prevent noise generated in the detection signal. Accordingly, accurate detection can be performed, thereby enhancing the detection position accuracy of the position sensor. Therefore errors in detection positions of the position sensor are unlikely to occur.

Furthermore, the excitation signal is formed as the sine wave digitized signal and the cosine wave digitized signal 90° shifted in phase from each other based on the reference clock. The rectangular wave excitation signal is converted to a sine wave by the low-pass filter. Accordingly, the sine wave and the cosine wave can be generated with more accurate waveforms, thereby enhancing the detection position accuracy of the position sensor.

DESCRIPTION OF EMBODIMENTS

A detailed description of a first embodiment of a position sensor embodying the present invention will now be given referring to the accompanying drawings.

Figure 1:
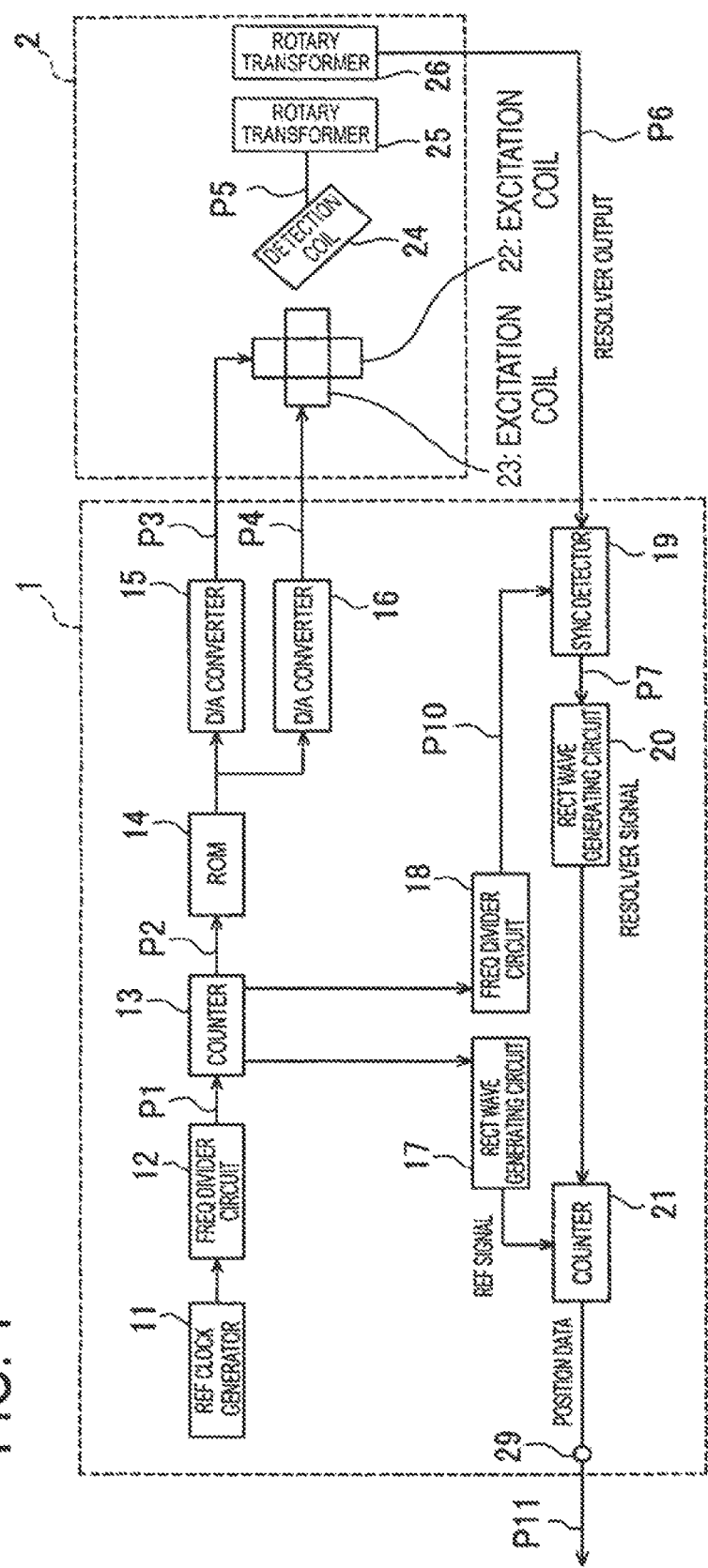
FIG. 1 is a block diagram showing a configuration of a resolver in a first embodiment of the invention.

The resolver incorporated with the position sensor in the first embodiment includes a sensor section, a stator, a rotor, and a control circuit. FIG. 1 is a block diagram showing a control configuration of the resolver including the position sensor of this embodiment. The resolver mainly comprises the sensor section 2 and a circuit section 1.

In the stator, a first excitation coil 22 and a second excitation coil 23 are fixedly provided. In the rotor, a detection coil 24 is fixedly arranged. A pair of rotary transformers 25 and 26 is attached to the stator and the rotor respectively in order to transmit an output signal generated as an induced current in the detection coil 24 to the stator. Those first excitation coil 22, second excitation coil 23, detection coil 24, rotary transformers 25 and 26 constitute the sensor section 2.

In the circuit section 1, on the other hand, a reference (ref) clock generator 11 for generating a high-frequency reference clock is connected to a frequency (freq) divider circuit 12. This frequency divider circuit 12 is connected to a counter 13. This counter 13 is also connected to a ROM 14, a rectangular (rect) wave generating circuit 17, and a frequency divider circuit 18, respectively. The ROM 14 is connected to a first D/A converter 15 for generating a sine wave for excitation and a second D/A converter 16 for generating a cosine wave for excitation.

The first D/A converter 15 is connected to the first excitation coil 22 of the sensor section 2 and the second D/A converter 16 is connected to the second excitation coil 23.

A magnetic field generated by the first and second excitation coils 22 and 23 produces an induced current in the detection coil 24. The detection coil 24 is connected to the pair of transformers 25 and 26. The rotary transformer 26 is connected to a synchronous (sync) detector 19. This synchronous detector 19 is connected to a rectangular wave generating circuit 20 and a frequency divider circuit 18, respectively. The rectangular wave generating circuit 20 is connected to a counter 21. This counter 21 is connected to the rectangular wave generating circuit 17 and provided with an output terminal 29 to be connected to an external device.

Figure 3:
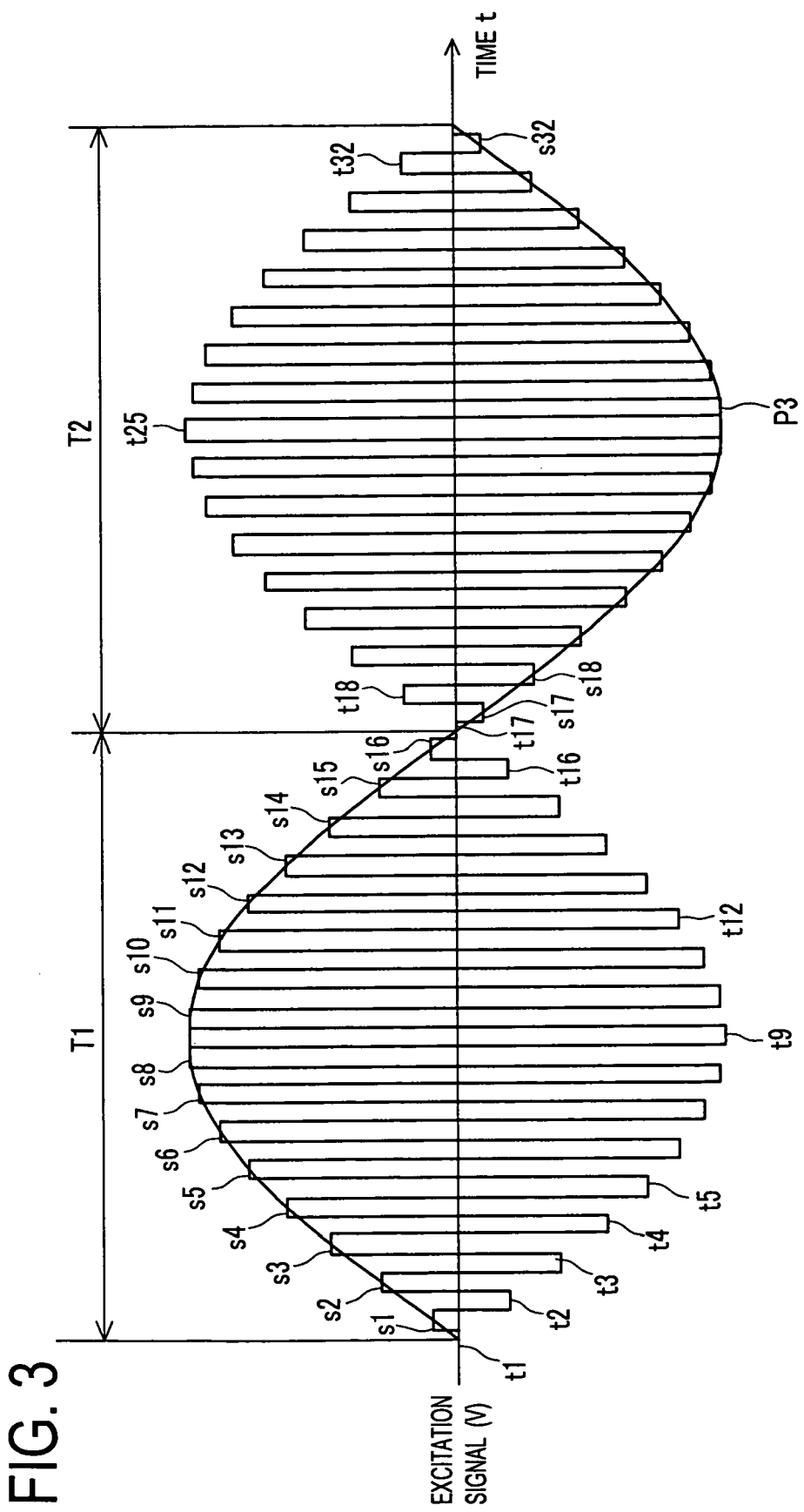
FIG. 3 is an explanatory view of an amplitude-modulated sine wave generated by a first D/A converter.

A following explanation is given to operations of the resolver having the above configurations. Functions of the D/A converters 15 and 16 are described. As shown in FIG. 3, a function of producing a sine wave by amplitude modulation of a pulse signal is first explained. Upon receipt of a high-frequency signal from the reference clock generator 11, the frequency divider circuit 12 produces a pulse signal P1 of 600 kHz. The counter 13 counts pulses of the pulse signal P1 of 600 kHz and transmits a pulse signal P2 accompanied by the count data to the first and second D/A converters 15 and 16 through the ROM 14. The ROM 14 has stored a program for producing an amplitude-modified sine wave and an amplitude-modified cosine wave. The ROM 14 is configured to perform the following operations in combination with the D/A converters 15 and 16.

The ROM 14 and the first D/A converter 15 generate a pulse with a negative amplitude t1 shown in FIG. 3 from a $1^{st}$ reference pulse of the pulse signal P2, and then produce a pulse with a positive amplitude s1 from a $2^{nd}$ reference pulse. In this way, during a time period T1 in FIG. 3, pulses with amplitudes t2, s2, t3, s3, ..., s15, t16, and s16 are sequentially produced based on the reference pulses. Furthermore, during a time period T2 in FIG. 3, pulses with amplitudes t17, s17, t18, ..., t32, and s32 are generated.

A sine wave of one cycle, 0° to 360°, is produced by the pulses with the positive amplitudes s1, s2, ..., s16 in the time period T1 the pulses with the negative amplitudes s17, s18, ..., s32 in the time period T2. Thus, the first D/A converter 15 outputs, as a signal, an amplitude-modulated sine wave P3 shown in FIG. 3. The frequency of the sine wave P3 is 300 kHz/32=9.375 kHz.

Figure 4:
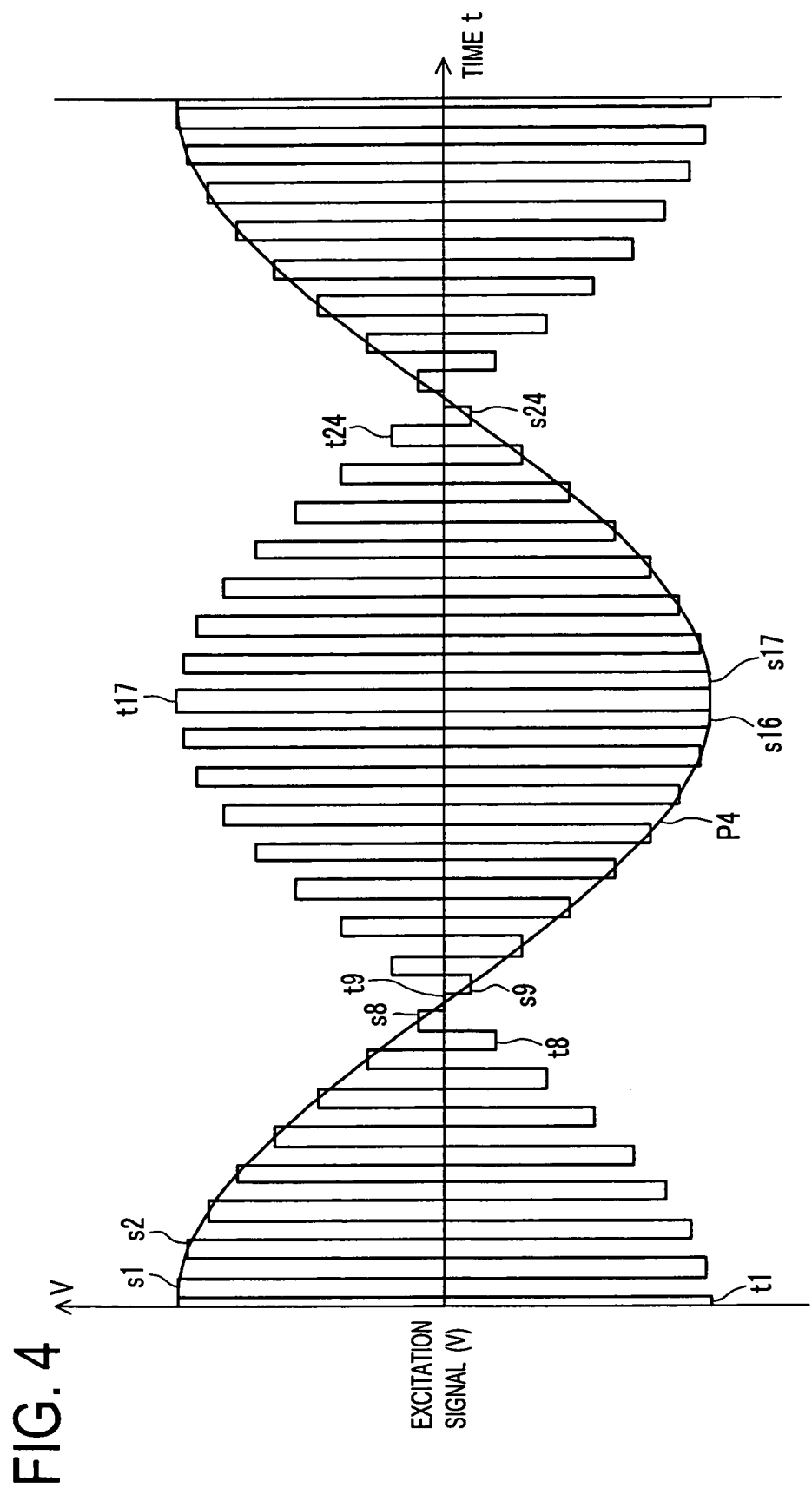
FIG. 4 is an explanatory view of an amplitude-modulated cosine wave generated by a second D/A converter.

Similarly, the ROM 14 and the second D/A converter 16 generate a pulse with a negative amplitude t1 shown in FIG. 4 from the $1^{st}$ reference pulse of the same pulse signal P2 as in FIG. 3, and then produce a pulse with a positive amplitude s1 from the $2^{nd}$ reference pulse. In this way, pulses with amplitudes t2, s2, t3, s3, ..., s15, t16, and s16 are sequentially produced based on the reference pulses. Furthermore, pulses with amplitudes t17, s17, t18, ..., t32, and s32 are generated.

A cosine wave of one cycle, 0° to 360°, is produced by the pulses with the positive amplitudes s1, s2, ..., s8, the negative amplitudes s9, s10, ..., s24, and the positive amplitudes s25, s26, ..., s32. Thus, the second D/A converter 16 outputs, as a signal, an amplitude-modulated cosine wave P4 shown in FIG. 4. The frequency of the sine wave 24 is 300 kHz/32=9.375 kHz. The sine wave P3 and the cosine wave P4 are exactly equal in frequency and are displaced or shifted accurately by 90° from each other.

The sine wave P3 output from the first D/A converter 15 is input to the first excitation coil 22. The cosine wave P4 output from the second D/A converter 16 is input to the second excitation coil 23. Specifically, the amplitude-modulated sine wave P3 (A sin ωt) of 9.375 kHz is supplied to the first excitation coil 22. The amplitude-modulated cosine wave P4 (A cos ωt) of 9.375 kHz is supplied to the second excitation coil 23.

Figure 6A:
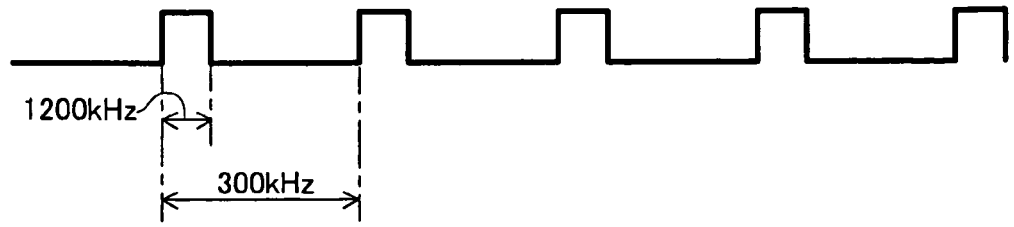
FIG. 6 is an explanatory view showing operations of a synchronous detector.
Figure 6B:
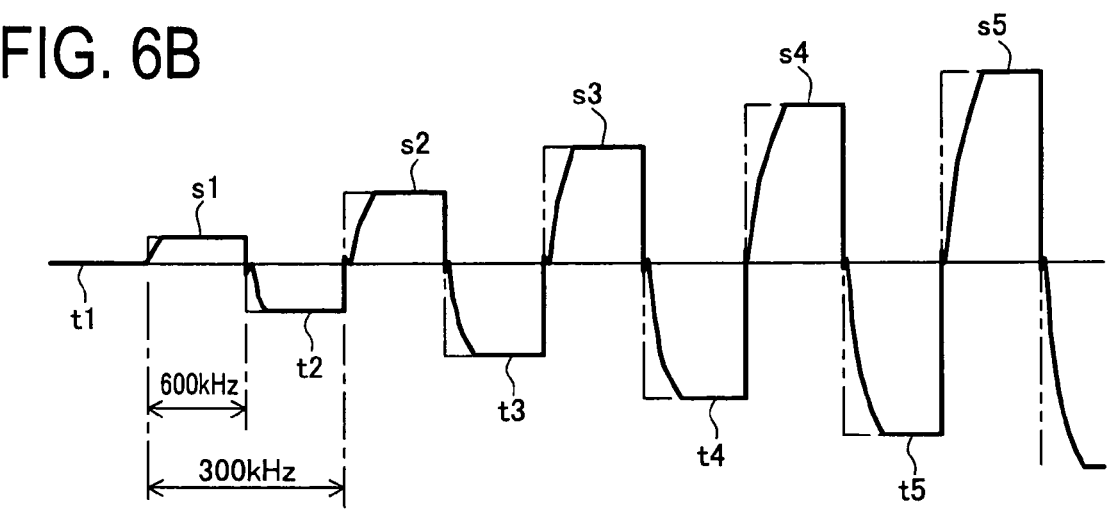
Figure 6C:
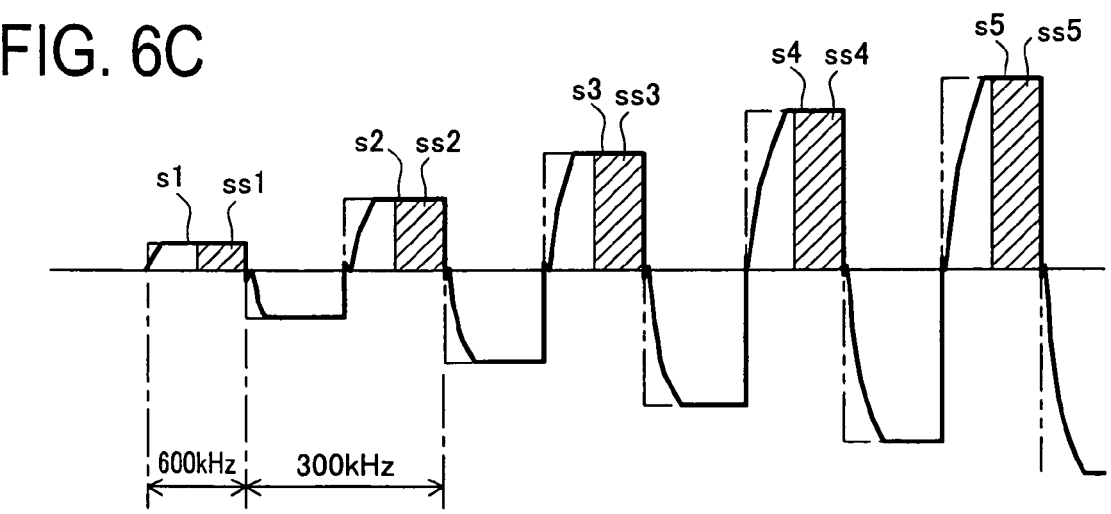

In the detection coil 24, an output signal P5, i.e., AB sin (ωt+θ), is generated as an induced current. The output signal P5 is transmitted as an output signal P6 to the synchronous detector 19 provided on the stator through the rotary transformers 25 and 26. FIG. 6B shows a waveform of the output signal P6. FIG. 6A shows a waveform of a detection timing signal P10 transmitted from the frequency divider circuit 18 to the synchronous detector 19. The detection timing signal P10 is generated as a signal of 1200 kHz. FIG. 6C shows a detected (demodulated) signal P7 obtained as a result of detection (demodulation) based on pulse timing of the detection timing signal P10.

As shown in FIG. 6B, in the waveform of the output signal P6 of the resolver, output from the rotary transformer 26, a delay occurs in a rising portion of the pulse signal. This is caused by a delay in the generation of the induced current. If this output signal P6 is directly measured, it may be erroneously detected as noise due to its undesired form. To avoid such disadvantage, in the present embodiment, the synchronous detector 19 is configured to set a detection time (corresponding to 1200 kHz) to half of a signal switch time (corresponding to 600 kHz) and delay the detection time by a time corresponding to 1200 kHz. Thus, a clear signal portion of each waveform s1, s2, ... of the output signal P6 can be extracted as each waveform ss1, ss2, ... (shown with oblique lines in FIG. 6C) of the detected signal P7. This makes it possible to enhance detection accuracy of the resolver.

The synchronous detector 19 transmits the detected signal P7 to the rectangular wave generating circuit 20. This circuit 20 transmits a detection signal of the resolver to the counter 21. The counter 21 counts a difference between the timing of the resolver signal transmitted from the rectangular wave generating circuit 20 and the timing of the reference signal transmitted from the rectangular wave generating circuit 17 to calculate a moving amount of the resolver. The counter 21 then outputs a resolver moving amount signal P11 via the output terminal 29 to the external device.

As explained above, in the present embodiment, the resolver includes the excitation coils 22 and 23 to which the excitation signals P3 and P4 formed by amplitude modulation of the high-frequency signal P2 are input and the detection coil 24 for outputting the detection signal P5. The resolver is adapted to detect a change in position of the rotor provided with the excitation coils 22 and 23 or the detection coil 24 based on the detection signal P5 which will vary according to the change in position of the rotor. Since the high-frequency signal P2 is a digital signal generated based on the pulse signal P1, a CR circuit for analog signal is not used for phase shift. Thus, there is no possibility that phase shift (displacement) is caused by temperature variation.

Specifically, the sine wave and the cosine wave mutually shifted by accurate 90° are produced by use of the pulse signal P1, thereby reducing a phase shift error. Thus, less error occurs in the detection position of the resolver.

Furthermore, the open timing of the synchronous detector 19 serving as a gate for passing the detection signal is delayed by a time corresponding to rising of the detection signal. This prevents the noise generated in the detection signal at the time of excitation signal switching. Thus, accurate detection can be performed and therefore the detection position accuracy of the resolver can be enhanced.

Next, a second embodiment of the present invention will be described. The second embodiment is basically identical to the first embodiment. The following explanation is therefore focused on differences in configurations and operations from those in the first embodiment. Like components or parts are given the same reference signs and respective explanations are not repeated hereafter.

Figure 2:
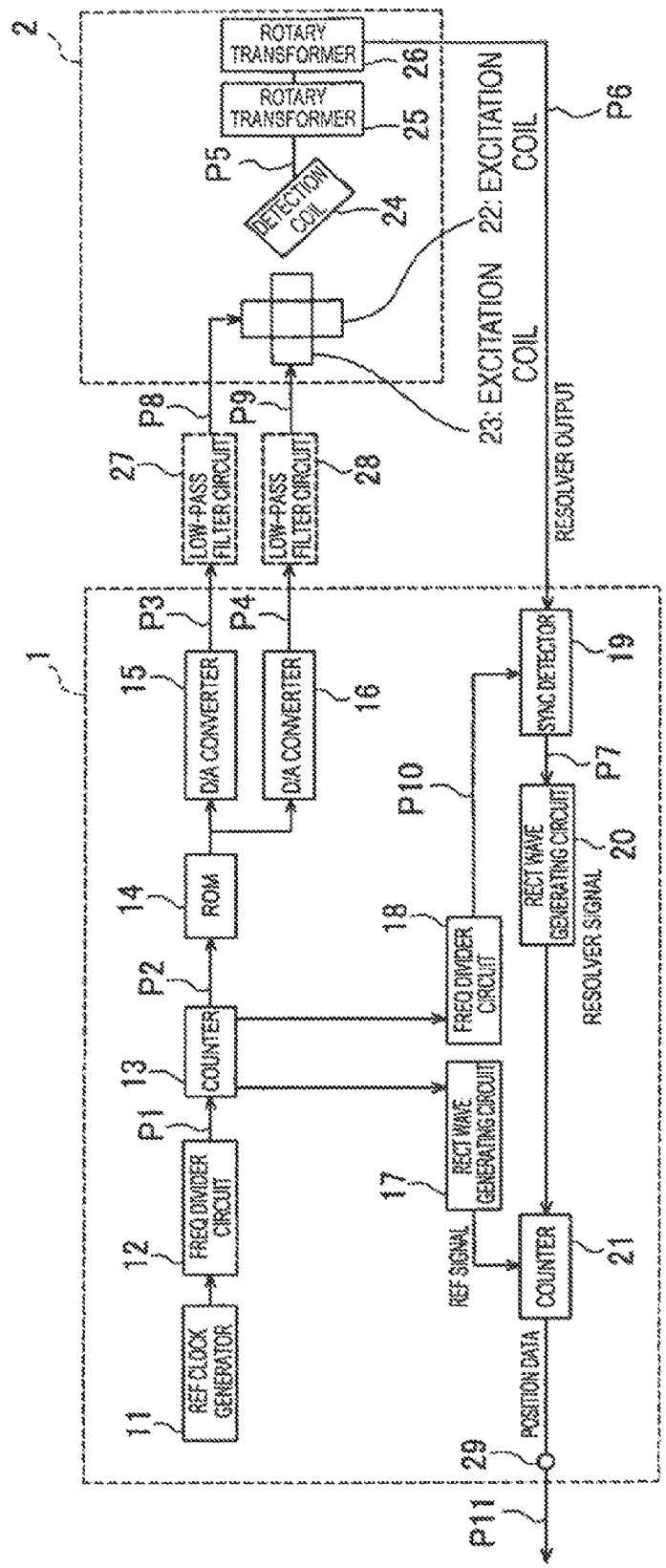
FIG. 2 is a block diagram showing a configuration of a resolver in a second embodiment of the invention.

FIG. 2 shows a configuration of the resolver in the second embodiment. This resolver is different from that in the first embodiment only in that a first low-pass filter circuit 27 is placed between the first D/A converter 15 and the first excitation coil 22 and a second low-pass filter circuit 28 is placed between the second D/A converter 16 and the second excitation coil 23.

Each of the low-pass filter circuits 27 and 28 has a function of making a sine wave form. Accordingly, when a pulse signal is input to each low-pass filter circuit 27 and 28, both upper corners of the pulse signal are smoothed to change the waveform of the pulse signal to a smooth curved line. Specifically, the first low-pass filter circuit 27 changes the sine wave P3 amplitude-modulated by the ROM 14 and the first D/A converter 15 shown in FIG. 3 to a waveform of smoothed pulse form as shown in FIG. 5.

Similarly, the amplitude-modulated cosine wave P4 output from the second D/A converter 16 is input to the second low-pass filter circuit 28. The low-pass filter circuit 28 smooth out both corners of the pulse signal which is a high-frequency signal, thereby rounding right angle corners of a pulse form into curved lines.

Figure 5:
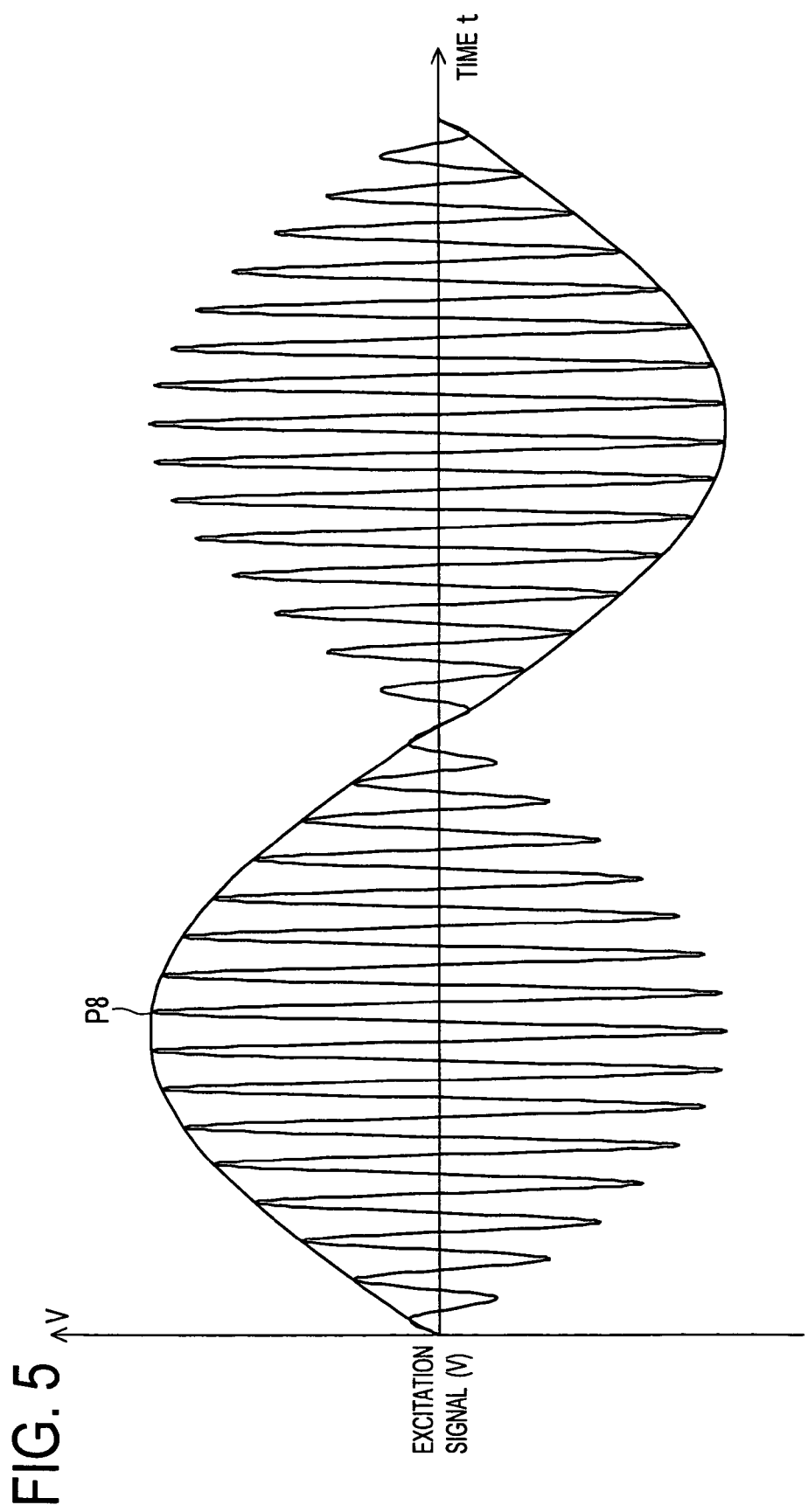
FIG. 5 is a view showing waveforms of an output signal of a low-pass filter circuit when a sine wave in the second embodiment is input to the low-pass filter circuit.

When the high-frequency components of the amplitude-modulated sine wave P3 and the amplitude-modulated cosine wave P4 are smoothed in the above way, the waveforms of the sine wave P3 and the cosine wave P4 can be changed to a waveform P8 shown in FIG. 5, which is more similar to the sine wave and the cosine wave.

As explained in detail above, according to the resolver in the second embodiment produces, based on the reference clock, the excitation signal is formed as the sine wave digitized signal P3 and the cosine wave digitized signal P4 which are mutually 90° shifted in phase. The high-frequency signal P2 is smoothed in the low-pass filter circuits 27 and 28. Accordingly, the sine wave P8 and the cosine wave P9 can be produced with more accurate waveforms, thereby enhancing the detection position accuracy of the resolver.

The present invention may be embodied in other specific forms without departing from the essential characteristics thereof. For instance, the above embodiments are explained about angle detection using the resolver. As an alternative, the first and second excitation coils may be linearly arranged to be applied to a position sensor for detecting a linear position.

The above embodiments explain the system of a phase difference technique combined with high-frequency modulation. The present invention may also be applied to a system of an amplitude technique combined with the high-frequency modulation.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A position sensor comprising:
a first excitation coil for receiving a first excitation signal; and
a detection coil for outputting a detection signal, wherein
either one of the first excitation coil and the detection coil is provided in a moving object,
the position sensor is arranged to detect a change in position of the moving object based on the detection signal varying depending on the change in position of the moving object,
the first excitation signal is produced based on a reference clock, and
the first excitation signal is an amplitude modulated high-frequency signal having a square wave shape, and an amplitude of the first excitation signal varies sinusoidally step-by-step.

2. The position sensor according to claim 1, further comprising a second excitation coil for receiving a second excitation signal, wherein
the second excitation signal is produced, based on the reference clock, and
the second excitation signal is an amplitude modulated high-frequency signal having a square wave shape, and an amplitude of the second excitation signal varies cosinusoidally step-by-step.

3. The position sensor according to claim 2, wherein
an opening timing of a gate for passing the detection signal is determined to be delayed by a time corresponding to rising of the detection signal.

4. The position sensor according to claim 1, wherein
an opening timing of a gate for passing the detection signal is determined to be delayed by a time corresponding to rising of the detection signal.

5. The position sensor according to claim 1, wherein
the first excitation signal having a square wave shape is converted to a sine wave signal by a low-pass filter before being supplied to the first excitation coil.

* * * * *